United States Patent [19]
Harrison, Jr.

[11] 3,899,834
[45] Aug. 19, 1975

[54] ELECTRONIC COMPASS SYSTEM

[75] Inventor: Earnest R. Harrison, Jr., Glen Burnie, Md.

[73] Assignee: Westinghouse Electric Corporation, Pittsburgh, Pa.

[22] Filed: Oct. 2, 1972

[21] Appl. No.: 294,134

[52] U.S. Cl. .................... 33/352; 33/361; 33/366; 33/DIG. 13
[51] Int. Cl. ... G01c 21/20; G01c 9/06; G01c 17/30
[58] Field of Search ............ 33/356, 351, 352, 312, 33/313, 310, 361, 366, DIG. 13, 303

[56] References Cited
UNITED STATES PATENTS

| | | | |
|---|---|---|---|
| 2,389,146 | 11/1945 | Fragola et al. | 33/361 |
| 3,133,244 | 5/1964 | Wojtulewicz | 33/356 |
| 3,791,043 | 2/1974 | Russell | 33/312 |

FOREIGN PATENTS OR APPLICATIONS

| | | | |
|---|---|---|---|
| 141,501 | 5/1953 | Sweden | 33/205 |
| 545,175 | 8/1956 | Italy | 33/312 |

Primary Examiner—Samuel B. Rothberg
Assistant Examiner—Richard R. Stearns
Attorney, Agent, or Firm—D. Schron

[57] ABSTRACT

A system comprised of a strain gage bridge configuration and a flux gate magnetometer arrangement which respectively provide three mutually orthogonal signal components of the earth's gravity and magnetic fields. The magnetometer assembly is mounted within a weighted housing which is suspended within another housing by means of a thin walled tube acting as a cantilever beam upon which the strain gage assembly is mounted. The strain gages provide a measure of the tilt of the compass housings in order to generate a synthetic horizontal plane from which the heading can be electronically computed from the magnetometer signal components.

12 Claims, 8 Drawing Figures

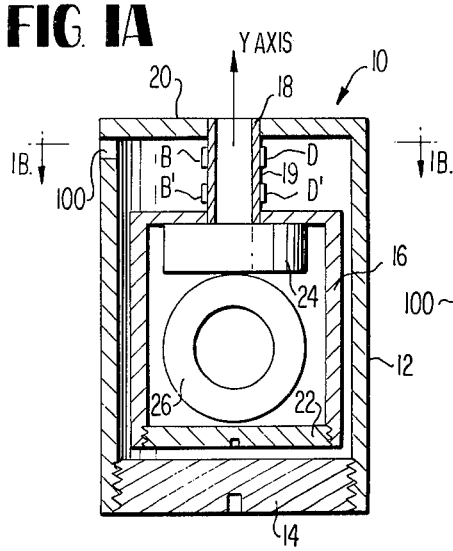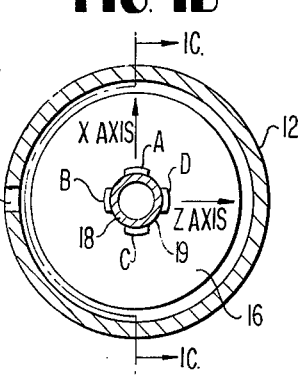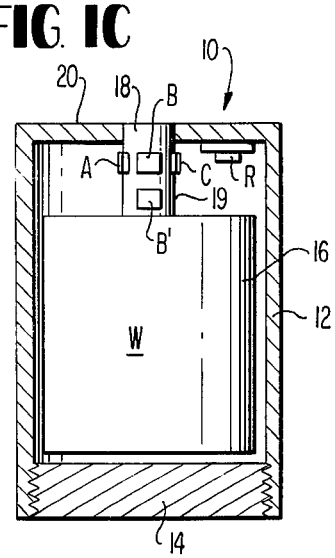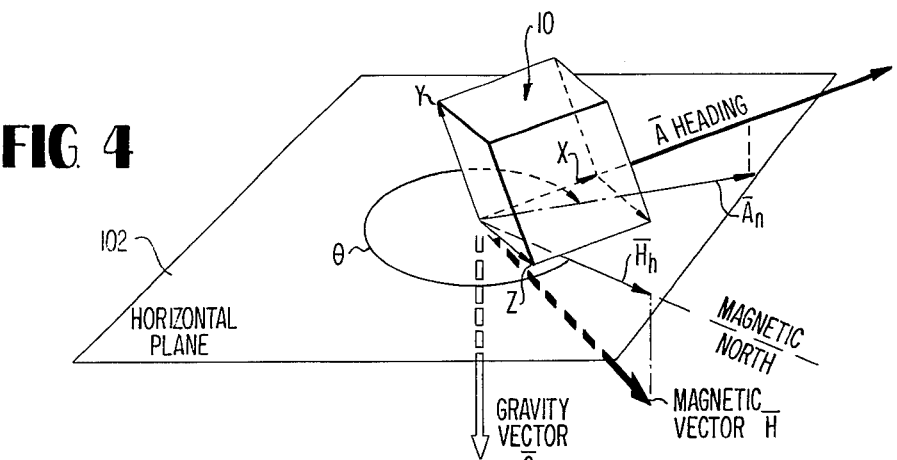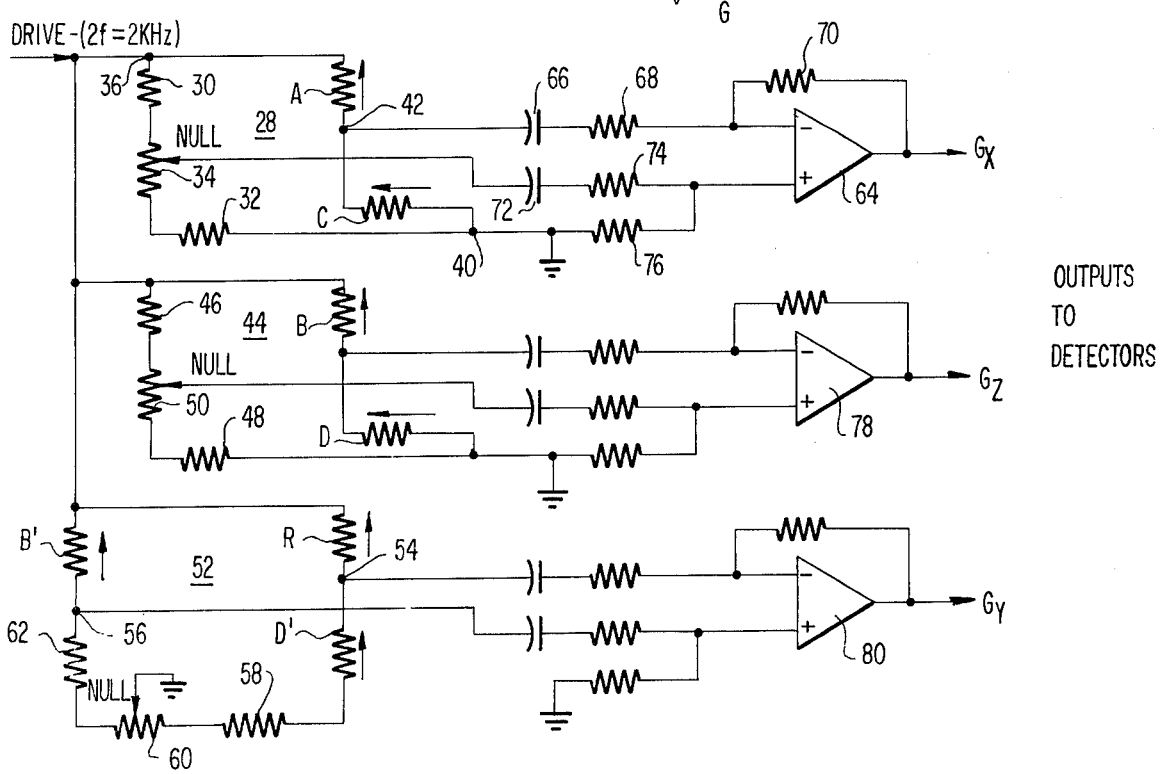

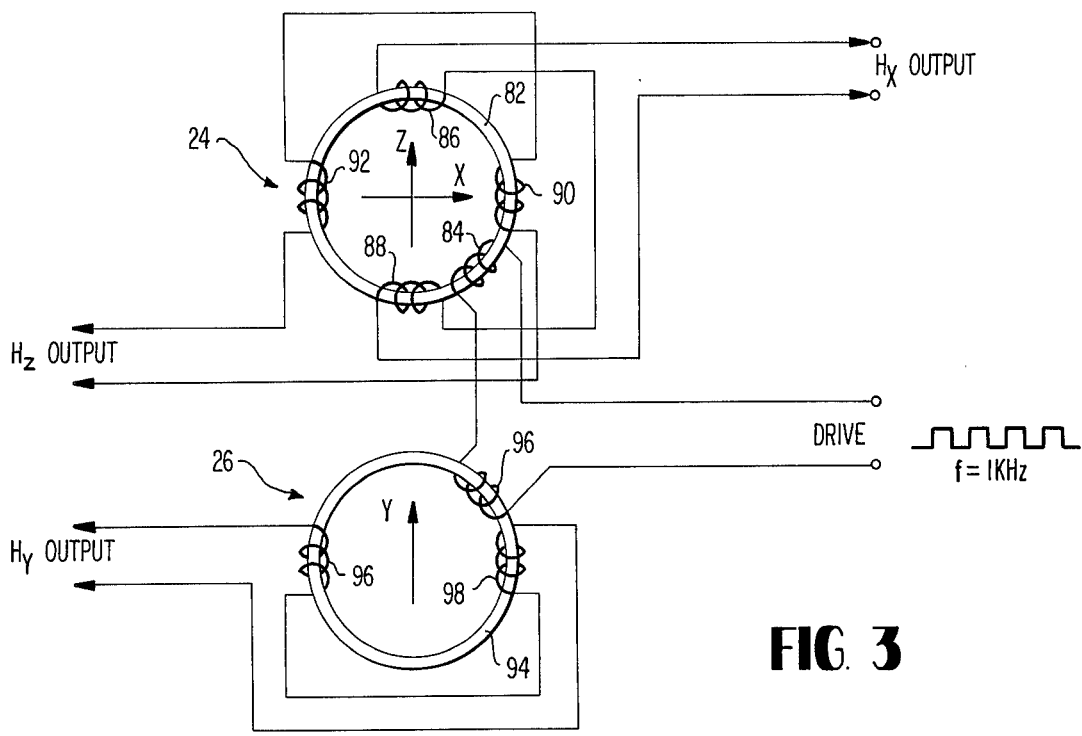
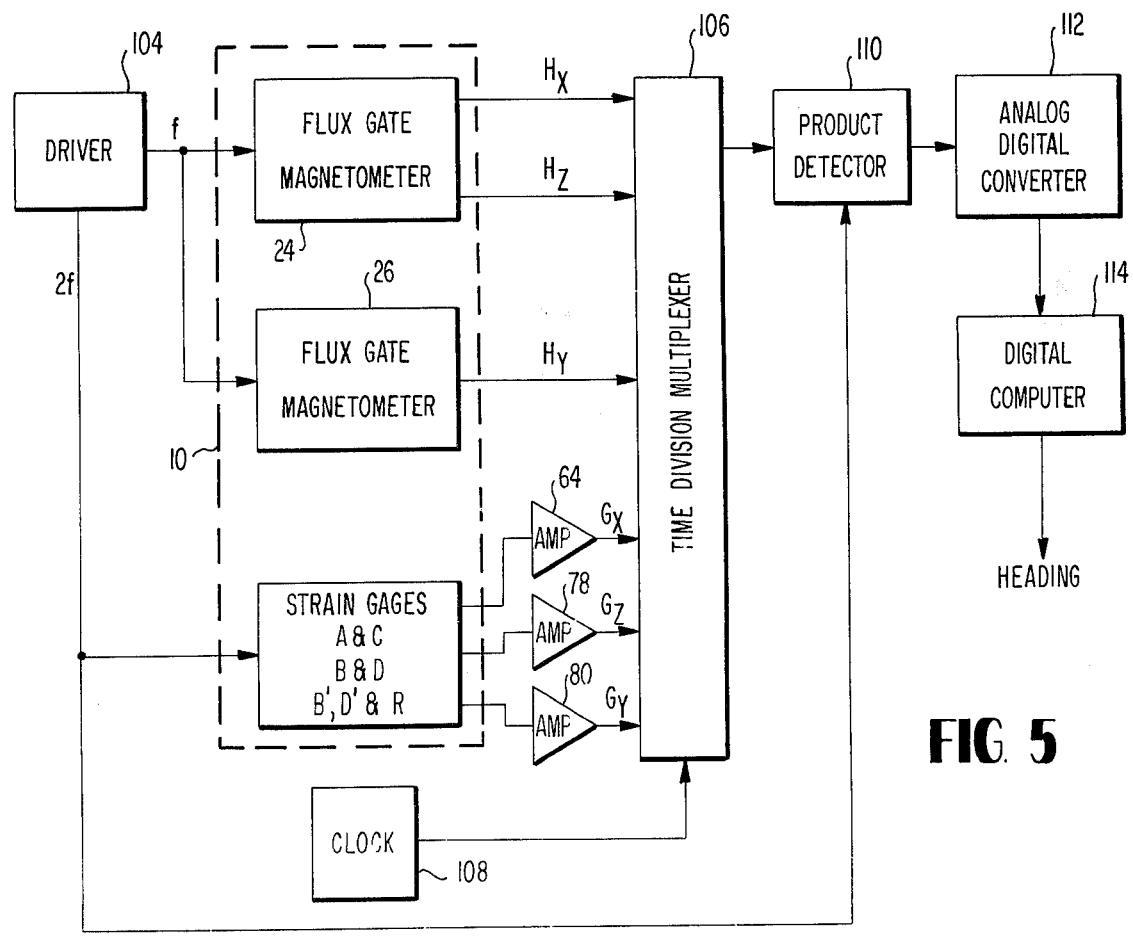
FIG. 3
FIG. 5

ELECTRONIC COMPASS SYSTEM

BACKGROUND OF THE INVENTION

1. Field of the Invention

This invention relates to systems which are responsive to the earth's magnetic field and more particularly to a heading reference system which can measure heading angle irrespective of whether the system is tilted forward, sideways, or both.

2. Description of the Prior Art

While the magnetic compass plays an important part in navigation, one of its most difficult problems is interfacing the compass into an electronic navigation system, the primary problem being that of controlling the tilt of the compass reference plane. It is well known that when a person reads a compass, it must be held in a substantially horizontal plane and must be held still until the tilting of the compass disc or needle settles down. For an electronic system such as used in vehicles for navigation, usually a large highly damped spherical pendulum is utilized to maintain the plane of a flux valve assembly horizontal. Such a teaching is included in U.S. Pat. No. 2,852,859, issued to Marlin C. Depp. Hall devices have also been utilized in magnetic heading measuring systems, one example of which is disclosed in U.S. Pat. No. 3,425,648, issued to F. P. Wipff, et al. The problem of connecting the magnetometers and/or Hall probes past a gimbal ring to associated electronic circuitry, however, is formidable. Also the limitations that the gimbal ring places on the angles of tilt and acceleration that can be tolerated is unsuitable for some specific applications, such as where a man-carried navigation equipment utilized for foot soldiers is intended.

SUMMARY

The compass system contemplated by the subject invention utilizes a strain gage accelerometer assembly to measure tilt while a magnetic probe assembly measures three mutually orthogonal magnetic field vector signal components, whereupon heading is calculated electronically from the accelerometer and magnetic probe readings. Both assemblies are contained within a non-magnetic housing, the magnetic probes being located in an interior housing comprising a weight suspended from a cantilever beam comprised of a thin walled tube, upon which the accelerometer assembly is mounted. Any tilting of the housing causes three mutually orthogonal signal components to be provided by the accelerometer assembly from which a synthetic horizontal plane is derived from which a heading angle can be calculated from the three mutually orthogonal magnetic vector component signals.

BRIEF DESCRIPTION OF THE DRAWINGS

FIGS. 1A-1C are cross-sectional views of the preferred embodiment of a strain gage accelerometer and a flux gate magnetometer assembly forming the subject invention;

FIG. 2 is an electrical schematic diagram of the circuitry utilized in connection with the strain gage accelerometer assembly;

FIG. 3 is an electrical schematic diagram of the flux gate magnetometer assembly;

FIG. 4 is a vector diagram helpful in understanding the operation of the subject invention;

FIG. 5 is a block diagram of a digital signal processor for computing heading from the three components of the magnetic and gravitational vectors measured by the subject invention.

DESCRIPTION OF THE PREFERRED EMBODIMENT

Figure 6:
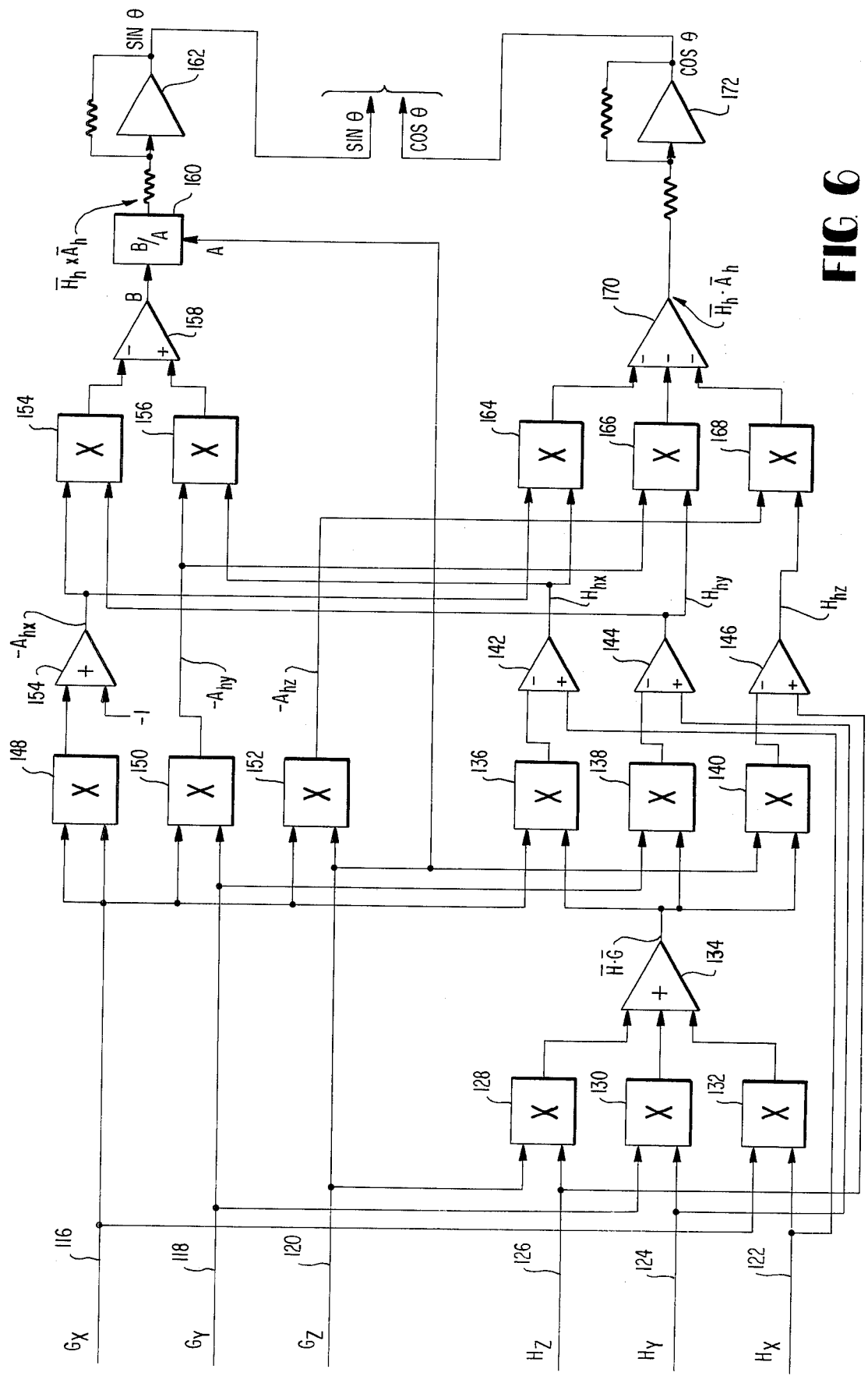
FIG. 6 is a block diagram illustrative of an analog signal processor for computing heading.

One can compute directional heading if the three respective mutually orthogonal components of the earth's magnetic and gravitational fields relative to the axis of a compass are known. To this end reference is now made to FIGS. 1A, 1B and 1C, which disclose the physical embodiment of a composite strain gage accelerometer and flux gate magnetometer assembly forming the invention. Reference numeral 10 generally denotes a non-magnetic housing assembly comprised of, inter alia, a cylindrical housing portion 12 having an opening in one end thereof with a screw threaded end portion 14 fitted thereto. The elements 12 and 14 are comprised of non-magnetic material. Interiorally of the first body portion 12 is located a second cylindrical body portion 16 being held in a substantially rigid spaced relationship with the outer body portion 12 by means of a thin walled tube 18 secured to the end wall 20 of the outer body portion 12. A screw threaded end piece 22 is fitted to the inner body portion 12. The outer and inner body portions 12 and 16 respectively, are thus coaxial along the Y axis shown in FIG. 1A.

Three pairs of strain gages A and C, B and D, B' and D', are mounted on the thin walled tube 18 in mutually opposed relationship on the outside surface 19. A reference strain gage R is mounted on the inner surface of the end wall 20 of the outer housing portion 12. The strain gages A, B . . . R, define as three axis strain gage accelerometer assembly for providing three orthogonal component output signals $G_x$, $G_y$ and $G_z$, corresponding to the earth's gravity field vector $\overline{G}$ relative to the three mutually orthogonal X, Y and Z axes through the housing 10 as shown in FIGS. 1A and 1B. The Y axis corresponds to the central axis of the body portions 12 and 16 while the X and Z axes are mutually perpendicular axes in a plane normal to the central axis of the body portions 12 and 16.

The strain gages are used to measure the strain on the thin walled tube 18 in response to a tilting of the assembly 10 away from the horizontal. The tube 18 acts as a cantilever beam secured at one end to the upper wall 20 of the outer body portion 12 with a weight W attached to the other end, which weight consists of the inner body portions 16 and its contents which comprises two ring core flux gate magnetometers 24 and 26 respectively mounted in the plane of the X-Z axis and a perpendicular plane coextensive with the Y axis.

The strain gages A and C are adapted to measure the stress on the tube 18 in the X direction, while strain gages B and D measure the stress in the Z direction. The strain gages B' and D' are used for measuring the stress on the tube 18 in the Y direction. Referring now to FIG. 2, the pairs of strain gages are connected in respective wheatstone bridge circuits. More particularly, strain gages A and C are connected in adjacent legs of bridge circuit 28. The opposite legs of the bridge circuit 28 is comprised of fixed resistors 30 and 32 of equal value, having a small nulling potentiometer 34 connected therebetween. An AC drive signal is connected across the bridge input terminals 36 and 40, while the output is taken from the common connection between the strain gages A and C at terminal 42 and the wiper of the potentiometer 34. In a like manner, strain gages B and D are connected into wheatstone bridge circuit 44 in combination with fixed resistors 46 and 48 and the potentiometer 50. In order for the strain gages B' and D' to measure stress in the Y direction, they must be connected in opposite legs of a bridge circuit such as shown with respect to the wheatstone bridge configuration shown by reference numeral 52. The strain gage pairs A and C and B and D being in adjacent legs of the respective bridge circuits 28 and 44 are self compensating insofar as temperature and long term drift effects are concerned. With respect to the bridge circuit 52 on the other hand, strain gages B' and D' are not self compensating and therefore the reference strain gage R is utilized for this purpose. Accordingly, strain gage B' and R are connected in adjacent legs of the bridge circuit 52 while strain gage D' is connected in a leg opposite from the reference strain gage R. The output terminals of the bridge 52 comprise terminals 54 and 56. The bridge leg including strain gage D' also includes a fixed resistor 58 coupled to a potentiometer 60 whose slider is returned to ground. The fourth leg of the bridge is comprised of fixed resistor 62 and the other portion of the potentiometer 60.

The output of the first bridge circuit 28 is coupled into the (−) input of an AC operational amplifier 64 by means of capacitive coupling comprising capacitor 66 and fixed resistor 68. A feedback resistor 70 is coupled from the output of the operational amplifier 64 back to the (−) input terminal. In a similar manner, the other output terminal of the bridge circuit 28 is coupled to the (+) input terminal of the operational amplifier by means of capacitor 72 and fixed resistor 74. Another fixed resistor 76 is coupled from the (+) input of the operational amplifier to ground which is common to the input terminal 40.

The output of the operational amplifier 64 comprises an AC signal $G_x$ which is a measure of the earth's gravitational field vector $\bar{G}$ along the X axis. In a like manner, the output terminals of the bridge circuit 44 meet into an operational amplifier 78 whose output comprises the AC signal $G_z$ which corresponds to a signal representative of the gravitational field along the Z axis. A third operational amplifier 80 is coupled to the output terminals 54 and 56 of the bridge circuit 52 for providing a signal $G_y$ which is a signal indicative of the earth's gravitational field along the Y axis. In all three bridge circuits 28, 44 and 52, an AC drive is preferably used in order to eliminate the inherent drift problems associated with DC operational amplifiers. The null controls comprising the potentiometers 34, 50 and 60 have small values compared to the other fixed resistors. These potentiometers are used to zero the respective output signals $G_x$, $G_y$ and $G_z$ during calibration. The circuitry shown in FIG. 2 thus provides output signals corresponding to rectangular components of the earth's gravity field from which a synthetic horizontal reference plane can be established. This horizontal reference is illustrated in the vector diagram shown in FIG. 4, which will be discussed in greater detail subsequently.

The per unit change in resistance $\Delta R/R$ of a strain gage is given by the equation:

$$\frac{\Delta R}{R} = K \frac{\Delta L}{L} \qquad (1)$$

where $\Delta L/L$ is the per unit change in length of the strain gage and K is a proportionality constant which depends upon the strain gage material utilized. Normally K is in the order of 2.0 to 4.0. The quantity $\Delta L/L$ for stress in the Y axis direction is equal to:

$$\frac{\Delta L}{L} = \frac{W_y}{EA} \qquad (2)$$

where $W_y$ is the weight W along the Y axis, A is the cross sectional area of the cantilever beam comprised of the thin walled tube 18, and E is Young's constant for the cantilevered beamed material. In the X and Z directions, the per unit change of length $\Delta L/L$ can be expressed by the following equation:

$$\frac{\Delta L}{L} = \frac{WL}{r^2 t E} \qquad (3)$$

where W is the weight in the appropriate X or Z direction, L is the effective length of the thin walled tube 18, r is the inside diameter of the tube and t is the wall thickness of the tube. Considering the Y axis as the vertical direction, it should be noted that for relatively small tilt angles of the compass the required acceleration accuracy is lower in the vertical direction than in the horizontal directions, that is the X and Z directions.

Referring now to FIG. 3, the schematic disclosed therein is illustrative of the flux gate magnetometer circuitry utilized for measuring the earth's magnetic $\bar{H}$ field relative to the X, Y, and Z axes. The circuitry comprises ring core magnetometers 24 and 26 shown physically oriented inside of the inner housing body portion 16 shown in FIG. 1A. Flux gate magnetometer 24 is comprised of a torroidal or ring core 82 upon which is wound drive winding 84 and a first pair of windings 86 and 88 connected in series opposition to provide a signal output $H_x$. A second pair of series opposition windings 90 and 92 provide an output signal $H_z$. The flux gate magnetometer 26, on the other hand, is comprised of a core 94 upon which is wound a drive winding 96 connected in series with the drive winding 84 and a single pair of output windings 96 and 98 connected in series opposition to provide an output signal $H_y$.

A ring core flux gate magnetometer as disclosed in FIG. 1A and FIG. 3 can be made with high sensitivity. For example, a device having a core diameter in the order of 0.5 inches can provide outputs greater than 0.5 volts for a full earth field (0.6 Oersted) with an output impedance of approximately 1,000 ohms. The electrical drive required for such a device is an AC signal in the order of 1KHz. The power required depends upon the volume of iron present in the ring core, but is normally about 10 to 20 milliwatts. The output signal has a frequency of twice the drive frequency due to the fact that there is a flux reversal twice for every complete cycle of the drive signal and must be "product detected" to retain the sign of the magnetic component. In the instant embodiment, the cabling required for the magnetometers 24 and 26 can pass through the center of the tube 18 while the necessary signal leads for the strain gages A ... R can be coupled through the opening 100 in the body portion 12.

Reference is now made to FIG. 4, which discloses the vector diagram illustrative of the compass assembly 10 tilted with respect to a horizontal plane 102. Reference characters X, Y and Z define the rectangular coordinate axes of the compass and are the directions along which the components of the earth's gravity field vector $\overline{G}$ and the magnetic field vector $\overline{H}$ are measured by the circuitry disclosed in FIGS. 2 and 3. The earth's gravity vector $\overline{G}$ can be expressed as:

$$\overline{G} = |\overline{G}_x| \overline{a}_x + |\overline{G}_y| \overline{a}_y + |\overline{G}_z| \overline{a}_z \quad (4)$$

where $|\overline{G}|$ is the scaler magnitude of the vector along a particular axis and $\overline{a}$ is a unit vector in the direction of the same particular axis. In the same manner, the earth's magnetic vector $\overline{H}$ can be expressed as:

$$\overline{H} = |\overline{H}_x| \overline{a}_x + |\overline{H}_y| \overline{a}_y + |\overline{H}_z| \overline{a}_z \quad (5)$$

It is assumed that the X axis of the compass is the reference axis and heading is determined by its direction. Therefore, the heading vector $\overline{A}$ is directed along the X axis. The heading angle $\theta$ is defined as the angle between the horizontal projections $\overline{A}_h$ and $\overline{H}_h$ of the heading vector $\overline{A}$ and the magnetic vector $\overline{H}$ into the horizontal plane 102. Utilizing vector analysis notation, the horizontal components of the vectors $\overline{A}$ and $\overline{H}$ can be expressed as:

$$\overline{A}_h = \overline{A} - \left(\frac{\overline{A} \cdot \overline{G}}{|\overline{G}|^2}\right)\overline{G} \text{ and,} \quad (6)$$

$$\overline{H}_h = \overline{H} - \left(\frac{\overline{H} \cdot \overline{G}}{|\overline{G}|^2}\right)\overline{G} \quad (7)$$

The vectors $\overline{A}_h$ and $\overline{H}_h$ projected into the horizontal plane are determined from the requirement that:

$$\overline{H}_h \cdot \overline{G} = 0 \quad (8)$$

and $$\overline{A}_h \cdot \overline{G} = 0 \quad (9)$$

due to the fact that $\overline{A}_h$ and $\overline{H}_h$ are perpendicular to $\overline{G}$.

In order to determine the angle $\theta$ between $\overline{A}_h$ and $\overline{H}_h$, a right handed coordinate system will be assumed. The heading angle $\theta$ is then defined as the angle from $\overline{H}_h$ to $\overline{A}_h$ in a clockwise direction looking down on the horizontal plane 102. Two well known vector identities then provide an expression for the heading angle $\theta$. These expressions are:

$$\overline{H}_h \cdot \overline{A}_h = |\overline{H}_h| |\overline{A}_h| \cos\theta \quad (10)$$

$$\overline{H}_h \times \overline{A}_h = |\overline{H}_h| |\overline{A}_h| \sin\theta \cdot \overline{a}_G \quad (11)$$

where $\overline{a}_G$ is simply a unit vector directed along the gravity vector $\overline{G}$. Solving equations (10) and (11) for $\theta$, the following expression is obtained:

$$\theta = \tan^{-1}\left[\left(\frac{\overline{H}_h \times \overline{A}_h}{\overline{G}}\right)\left(\frac{|\overline{G}|}{\overline{H}_h \cdot \overline{A}_h}\right)\right] \quad (12)$$

Since the cross product of $\overline{H}_h$ and $\overline{A}_h$ is parallel to the gravity vector G, their ratio has significance, specifically:

$$\frac{\overline{H}_h \times \overline{A}_h}{\overline{G}} = \frac{(\overline{H}_h \times \overline{A}_h)_y}{\overline{G}_y} \text{ where } \overline{G}_y \neq 0 \quad (13)$$

$$\frac{\overline{H}_h \times \overline{A}_h}{\overline{G}} = \frac{(\overline{H}_h \times \overline{A}_h)_z}{\overline{G}_z} \text{ where } \overline{G}_z \neq 0. \quad (14)$$

It should be pointed out if $G_y$ and $G_z$ equal 0, then the heading vector $\overline{A}$ is pointing straight up or straight down and the heading defined under these conditions is meaningless.

In view of the foregoing mathematical derivations, a digital computer can readily solve equation (12) if interfaced with the compass assembly 10 as shown in the block diagram as illustrated in FIG. 5. Considering now FIG. 5, the two flux gate magnetometers 24 and 26 are driven from an AC driver circuit 104 providing a square wave input thereto of a frequency f which respectively provide output signals of $H_x$, $H_z$ and $H_y$, which respectively correspond to the scaler quantities $|\overline{H}_x|, |\overline{H}_z|$ and $|\overline{H}_y|$ and having a frequency of 2f. The strain gage pairs A and C, B and D, and B', D' and R are also driven from the driver circuit 104 that provides a signal thereto having a frequency of 2f as shown in FIG. 2. Output signals of $G_x$, $G_z$ and $G_y$, are provided corresponding to the scaler quantities $|\overline{G}_x|, |\overline{G}_z|$ and $|\overline{G}_y|$. A time division multiplexer circuit 106 under the control of a clock 108 feeds the signals $H_x$, $H_z$, $H_y$ and $G_x$, $G_z$ and $G_y$ sequentially to a "product detector" 110 also receiving a driving signal of frequency 2f from the driver circuit 104. The product detector 110 is coupled to an analog to digital converter 112 which feeds its output into a digital computer 114 from digitally computing the heading angle $\theta$ in accordance with the equation (3).

An analog signal processor for calculating the dot product ($\cdot$) of $\overline{H}_h$ and $\overline{A}_h$ as defined by equation (10) and the cross product ($\times$) thereof as defined by equation (11) is shown in FIG. 6. The block diagram shown for purposes of illustration includes, inter alia, input lines 116, 118 and 120 to which is applied the signals corresponding to $G_x$, $G_y$ and $G_z$, respectively. The signals $H_x$, $H_y$ and $H_z$ are applied on input lines 122, 124 and 126. The signals $G_z$ and $H_z$ are applied to a multiplier circuit 128 while identical multiplier circuits 130 and 132 receive inputs of $G_y$ and $H_y$, and $G_x$ and $H_x$, respectively. The respective outputs of the multipliers 128, 130 and 132 feed into an adder circuit 134 which provides an output of $\overline{H} \cdot \overline{G}$. The output of the adder circuit 134 simultaneously is fed to three identical multiplier circuits 136, 138 and 140 which respectively receive additional inputs of $G_x$, $G_y$ and $G_z$. An operational amplifier 142 receives at its (−) input a signal from the multiplier circuit 136 and the signal $H_x$ at its (+) input and provides an output corresponding to $H_{h,x}$ while identical operational amplifiers 144 and 146 provide outputs of $H_{h,y}$ and $H_{h,z}$.

Three multiplier circuits 148, 150 and 152 are also included in the block diagram shown in FIG. 6 wherein multiplier circuit 148 receives only the input $G_x$ while multiplier circuits 150 and 152 receive inputs of $G_x$ and $G_y$ and $G_x$ and $G_z$. The output of multiplier circuit 148 feeds into an inverting amplifier 154 to provide an output signal corresponding to $-A_{h_x}$. Multipliers 150 and 152, on the other hand, directly provide outputs of $-A_{h_y}$ and $-A_{h_z}$, respectively. The output signals $-A_{h_x}$, $-A_{h_y}$ and $H_{h_z}$ are appropriately fed to a pair of multiplier circuits 154 and 156 whose respective outputs are then applied through an amplifier 158 and a divider circuit 160 whose output comprises the cross product of $H_h$ and $A_h$. This output is fed through an operational amplifier 162 whose output corresponds to a signal of $\sin \theta$.

Three additional multiplier circuits 164, 166 and 168 receive appropriate signals $-A_h$ and $H_h$ which feed into an adder circuit 170 which provides an output corresponding to the dot product of $\bar{H}_h$ and $\bar{A}_h$. An operational amplifier 172 is coupled to the output of the adder circuit 170 to provide a signal corresponding to $\cos \theta$ which along with the signal corresponding to the $\sin \theta$ can be coupled to electrical mechanical synchro apparatus for providing a reading of the angle $\theta$.

The analog circuitry shown in FIG. 6 may require low pass filtering or integration of the strain gage accelerometer signals $G_x$, $G_y$ and $G_z$ in order to eliminate the errors caused by short term accelerations. The characteristic of the filters used depends on the environment that the array is utilized with, but it would be possible to dynamically control the filter parameters as the noise characteristics vary.

What has been shown and described, therefore, is an electronic compass having no moving parts and wherein a single compass assembly measures all parameters required to determine heading regardless of the tilt angle. The compass, moreover, is small and compact, making it particularly suitable for applications such as a man-packed navigation system.

Having described what is at present considered to be the preferred embodiment of the subject invention:

I claim:

1. A compass assembly powered from an electrical driver circuit, comprising in combination:
    non-magnetic support means including a fixed reference axis;
    a cantilever beam member having one end rigidly attached to said support means;
    a weight under the influence of the earth's gravitational field attached to the other end of said beam member;
    an electrical accelerometer assembly mounted on said beam member and responsive to the stress upon said beam member caused by said weight for a specific orientation in space to provide a first plurality of output signals corresponding to the three components of the earth's gravitational field relative to a predetermined coordinate system of said support means including said fixed reference axis;
    a flux gate magnetometer assembly supported from said support means and energized from said driver circuit, providing a second plurality of output signals corresponding to the three components of the earth's magnetic field with respect to said predetermined coordinate system; and
    data processor means coupled to said accelerometer and magnetometer assemblies for computing the heading of the projection of said reference axis onto the horizontal plane with respect to the projection of the earth's magnetic field onto the horizontal plane from said first and second plurality of output signals.

2. The system as defined by claim 1 wherein said non-magnetic support means comprises a first non-magnetic housing and said weight comprises a second non-magnetic housing disposed within said first housing.

3. The system as defined by claim 2 wherein said cantilevered beam member comprises a relatively thin walled tubular member.

4. The system as defined by claim 3 wherein said accelerometer assembly comprises a plurality of strain gages mounted in mutually opposed pairs on a wall of said tubular member.

5. The system as defined by claim 4 wherein there are at least three mutually opposed pairs of strain gages mounted on a wall of said tubular member and additionally including respective electrical bridge circuit means, energized from said driver circuit, coupled to each pair of strain gages to provide at least three rectangular coordinate output signals corresponding to components of the earth's gravitational field along the three mutually perpendicular axes of said first and second housing comprising said predetermined coordinate system.

6. The system as defined by claim 5 wherein at least one pair of strain gages are connected in adjacent legs of their respective bridge circuit.

7. The system as defined by claim 6 wherein another pair of strain gages are connected in opposite legs of their respective electrical bridge circuit and additionally including another strain gage mounted apart from said tubular member and being connected into a leg adjacent to one of said strain gages.

8. The system as defined by claim 4 wherein said flux gate magnetometer assembly is mounted in said second housing member.

9. The system as defined by claim 8 wherein said magnetometer assembly comprises a first and a second ring core mounted mutually perpendicularly to one another and being selectively aligned with at least one coordinate axis of said first housing, said first ring core having a drive winding wound thereon and adapted to be excited by a drive signal applied thereto from said driver circuit and a first and second pair of windings respectively connected in series opposition to provide a first and a second rectangular coordinate output signal corresponding to the earth's magnetic field along two of three mutually perpendicular axes of said first and second housing and said second ring core includes a drive winding wound thereon and coupled to a drive signal applied thereto from said driver circuit and a pair of windings connected in series opposition on said second core to provide a third rectangular coordinate output signal corresponding to the earth's magnetic field along the third of said three axes.

10. The system as defined by claim 1 wherein said data processor means comprises an analog signal processor.

11. The apparatus as defined by claim 1 wherein said data processor means comprises a digital computer and additionally including computer interface circuitry between said accelerometer assembly and said flux gate magnetometer assembly including analog to digital converter means.

12. The apparatus as defined by claim 1 wherein:
said non-magnetic support means comprises a cylindrical body portion;
said beam member comprises a relatively thin walled tubular member mounted substantially vertically in said housing;
said weight comprises a second cylindrical non-magnetic housing wherein said flux gate magnetometer assembly is mounted therein, said magnetometer assembly comprising a first magnetometer core assembly mounted in a substantially horizontal plane and a second core assembly mounted in a substantially vertical plane.

* * * * *